United States Patent
Aoyagi et al.

(10) Patent No.: US 9,071,941 B2
(45) Date of Patent: Jun. 30, 2015

(54) MOBILE COMMUNICATION SYSTEM, NETWORK DEVICE, AND MOBILE COMMUNICATION METHOD

(75) Inventors: Kenichiro Aoyagi, Yokosuka (JP); Yasuhiro Kawabe, Yokosuka (JP); Hideyuki Matsutani, Yokohama (JP); Yuichiro Nakamura, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 458 days.

(21) Appl. No.: 13/518,120

(22) PCT Filed: Dec. 21, 2010

(86) PCT No.: PCT/JP2010/073029
§ 371 (c)(1),
(2), (4) Date: Aug. 22, 2012

(87) PCT Pub. No.: WO2011/078182
PCT Pub. Date: Jun. 30, 2011

(65) Prior Publication Data
US 2012/0322409 A1    Dec. 20, 2012

(30) Foreign Application Priority Data
Dec. 21, 2009 (JP) ................................. 2009-289777

(51) Int. Cl.
  *H04M 1/66* (2006.01)
  *H04W 4/04* (2009.01)
  *H04W 48/04* (2009.01)
  *H04W 4/00* (2009.01)
  (Continued)

(52) U.S. Cl.
  CPC .............. *H04W 4/043* (2013.01); *H04W 4/001* (2013.01); *H04W 4/021* (2013.01); *H04W 84/045* (2013.01); *H04W 48/04* (2013.01)

(58) Field of Classification Search
  CPC ..... H04W 88/08; H04W 76/02; H04W 60/00; H04W 36/08; H04W 84/18
  USPC ........... 455/434–444, 410–411; 370/328–338
  See application file for complete search history.

(56) References Cited

U.S. PATENT DOCUMENTS 8,027,687 B2 * 9/2011 Jung et al. ...................... 455/450
8,437,763 B2 * 5/2013 Venkatachalam ............. 455/444
(Continued)

FOREIGN PATENT DOCUMENTS

CN    101600157 A    12/2009
JP    2009 206716      9/2009
(Continued)

OTHER PUBLICATIONS

Chinese Office Action issued Apr. 14, 2014, in China Patent Application No. 201080058724.1 (with English translation).
(Continued)

*Primary Examiner* — Sharad Rampuria
(74) *Attorney, Agent, or Firm* — Oblon, McClelland, Maier & Neustadt, L.L.P.

(57) ABSTRACT

A mobile communication system 100 includes a specific cell configured to allow a specific user to be provided with a service and to allow a non-specific user other than the specific user to be provided with a limited service. The mobile communication system 100 includes a management unit 23 configured to manage a presence state of the non-specific user in the specific cell in addition to a presence state of the specific user in the specific cell.

8 Claims, 5 Drawing Sheets

(51) Int. Cl.
*H04W 4/02* (2009.01)
*H04W 84/04* (2009.01)

(56) References Cited

U.S. PATENT DOCUMENTS

| | | | |
|---|---|---|---|
| 8,515,394 B2 * | 8/2013 | Bae et al. | 455/411 |
| 8,532,655 B2 * | 9/2013 | Tsuneda et al. | 455/435.1 |
| 8,903,413 B2 * | 12/2014 | Ji et al. | 455/453 |
| 2008/0267153 A1 * | 10/2008 | Mukherjee et al. | 370/338 |
| 2009/0070694 A1 * | 3/2009 | Ore et al. | 715/764 |
| 2010/0069069 A1 * | 3/2010 | Lee et al. | 455/435.2 |
| 2011/0105109 A1 | 5/2011 | Uemura et al. | |
| 2011/0170517 A1 * | 7/2011 | Bakker et al. | 370/331 |
| 2011/0171953 A1 * | 7/2011 | Faccin et al. | 455/426.1 |
| 2011/0216732 A1 * | 9/2011 | Maeda et al. | 370/329 |
| 2012/0315870 A1 * | 12/2012 | Aoyagi | 455/406 |
| 2013/0023270 A1 * | 1/2013 | Hosono et al. | 455/436 |

FOREIGN PATENT DOCUMENTS

| | | |
|---|---|---|
| JP | 2011 523308 | 8/2011 |
| WO | 2009 149431 | 12/2009 |
| WO | 2009 150943 | 12/2009 |
| WO | WO 2010053166 A1 * | 5/2010 |

OTHER PUBLICATIONS

3GPP TS 36.331 V8.6.0, "$3^{rd}$ Generation Partnership Project; Technical Specification Group Radio Access Network; Evolved Universal Terrestrial Radio Access (E-UTRA) Radio Resource Control (RRC); Protocol Specification," Total 207 Pages, (Jun. 2009).

Umesh, A., et al., "Higher layer radio interface for Release 9 LTE and LTE-Advanced," Proceedings of the 2009 IEICE General Conference, pp. S-46-S-47, (Mar. 4, 2009) (with partial English translation).

Japanese Office Action Issued Nov. 1, 2011 in JP 2009 289777 Filed Dec. 21, 2009 (with English translation).

International Search Report Issued Apr. 5, 2011 in PCT/JP10/73029 Filed Dec. 21, 2010.

\* cited by examiner

MOBILE COMMUNICATION SYSTEM, NETWORK DEVICE, AND MOBILE COMMUNICATION METHOD

TECHNICAL FIELD

The present invention relates to a mobile communication system including a specific cell configured to allow a specific user to be provided with a service, a network device and a mobile communication method used in the mobile communication system.

BACKGROUND ART

A specific cell called a CSG (Closed Subscriber Group) cell, a home cell, or a femtocell is known. An access type can be set for the specific cell. The access type is "Closed," "Hybrid," or "open."

A "Closed" specific cell is configured to allow only to a specific user (UE; User equipment) to be provided with a service. A "Hybrid" specific cell is configured to allow the specific user to perform communications in a higher quality than that performed by other users (non-specific users). An "Open" specific cell is configured to allow all the users to be provided with a service, as in a general macrocell (for example, Patent Document 1).

PRIOR ART DOCUMENTS

Non-Patent Documents

NON-PATENT DOCUMENT 1; 3GPP TS36.331 v8.6.0

SUMMARY OF THE INVENTION

The specific cell allowing only the specific user to be provided with the service has a problem that the service cannot be provided to a non-specific user because a presence state (a state of the non-specific user camping on the specific cell) of the non-specific user cannot be managed.

Thus, the present invention is made to solve the above-described problem, and an objective thereof is to provide a mobile communication system, a network device, and a mobile communication method that manage a presence state of a non-specific user to allow a provision of new services.

A mobile communication system according to the first feature has a specific cell configured to allow a specific user to be provided with a service and to allow a non-specific user other than the specific user to be provided with a limited service. The mobile communication system includes a management unit configured to manage a presence state of the non-specific user in the specific cell in addition to a presence state of the specific user in the specific cell.

In the first feature, the mobile communication system further includes a detection unit configured to detect attach process to the specific cell by the non-specific user, a location registration to the specific cell by the non-specific user, and a setup completion of a communication call to the specific cell by the non-specific user. The management unit manages a presence of the non-specific user in the specific cell on the basis of a result of the detection by the detection unit.

In the first feature, the mobile communication system further includes a detection unit configured to detect detach process from the specific cell by the non-specific user, a failure in location registration to the specific cell by the non-specific user, and a release of communication call setup to the specific cell by the non-specific user. The management unit manages an absence of the non-specific user in the specific cell on the basis of a result of the detection by the detection unit.

In the first feature, the mobile communication system further includes a detection unit configured to detect attach process to a cell other than the specific cell by the non-specific user, a location registration to the cell other than the specific cell by the non-specific user, and a setup completion of a communication call to the cell other than the specific cell by the non-specific user. The management unit manages an absence of the non-specific user in the specific cell based on a result of the detection by the detection unit.

In the first feature, the mobile communication system further includes a notification unit configured to, when a presence of a predetermined specific user in the specific cell is detected, notify the presence states of the specific user and the non-specific user managed by the management unit.

In the first feature, the mobile communication system further includes a notification unit configured to, when an absence of a predetermined specific user in the specific cell is detected, notify the presence states of the specific user and the non-specific user managed by the management unit.

A network device according to the second feature is provided in a mobile communication system including a specific cell configured to allow a specific user to be provided with a service and to allow a non-specific user other than the specific user to be provided with a limited service. The network device includes a management unit configured to manage a presence state of the non-specific user in the specific cell in addition to a presence state of the specific user in the specific cell.

A mobile communication method according to the third feature is used in a mobile communication system including a specific cell configured to allow a specific user to be provided with a service and to allow a non-specific user other than the specific user to be provided with a limited service. The mobile communication method includes the step of managing a presence state of the non-specific user in the specific cell in addition to a presence state of the specific user in the specific cell.

MODES FOR CARRYING OUT THE INVENTION

A mobile communication system according to an embodiment of the present invention is described below with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

OVERVIEW OF EMBODIMENT

A mobile communication system according to an embodiment includes a specific cell allowing a specific user to be provided with services whereas allowing a non-specific user other than the specific user to be provided with limited services. The mobile communication system includes a management unit configured to manage a presence state of the non-specific user in the specific cell in addition to a presence state of the specific user in the specific cell.

In the embodiment, the management unit manages the presence state of the non-specific user in the specific cell in addition to the presence state of the specific user in the specific cell. Thus, through the management of the presence state of the non-specific user, new services can be provided.

For example, the new services include: (1) a service of notifying a user managing a specific cell of presence states of a specific user and a non-specific user (report service); (2) a service of notifying a manager such as a security company of the presence states of the specific user and the non-specific user (security service); (3) a service of locking an entrance for a building or a room in which the specific cell is provided on the basis of the presence states of the specific user and the non-specific user (locking service); and (4) a service of controlling a home electrical appliance provided near the specific cell on the basis of the presence states of the specific user and the non-specific user (home network service).

Preferably, in the embodiment the specific cell is a cell deployed in a small scale and in a large scale. The specific cell is preferably a cell including an HNB (Home NodeB), an HeNB (Home Evolved NodeB), a femto BTS, and the like.

First Embodiment (Configuration of Mobile Communication System)

Figure 1:
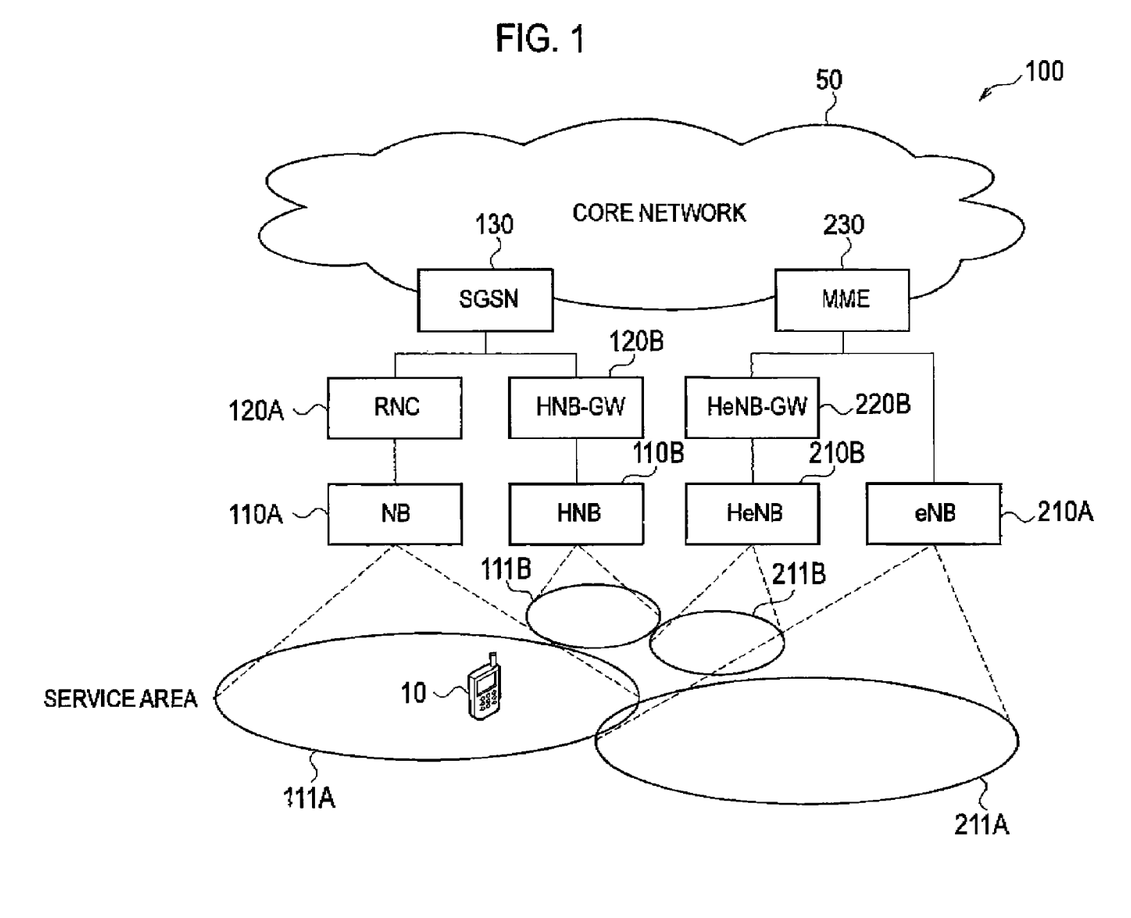
FIG. 1 is a diagram showing a mobile communication system 100 according to a first embodiment.

A configuration of a mobile communication system according to a first embodiment is described below with reference to a drawing. FIG. 1 is a diagram showing a mobile communication system 100 according to the first embodiment.

As shown in FIG. 1, the mobile communication system 100 includes a communication terminal device 10 (hereinafter, UE 10) and a core network 50. Furthermore, the mobile communication system 100 includes a first communication system and a second communication system.

The first communication system is a communication system supporting UMTS (Universal Mobile Telecommunication System) for example. The first communication system includes a base station 110A (hereinafter, NB 110A), a home base station 110E (hereinafter, HNB 110B), an RNC 120A, a home base station gateway 120B (hereinafter, HNB-GW 120B), and an SGSN 130.

A radio access network (UTRAN; Universal Terrestrial Radio Access Network) corresponding to the first communication system includes the NB 110A, the HNB 110B, the RNC 120A, and the HNB-GW 120B.

The second communication system is a communication system corresponding to an LTE (Long Term Evolution) for example. For example, the second communication system includes a base station 210A (hereinafter, eNB 210A), a home base station 210B (hereinafter, HeNB 210B), a home base station gateway 220B (hereinafter, HeNB-GW 220B), and an MME 230.

A radio access network (E-UTRAN; Evolved Universal Terrestrial Radio Access Network) corresponding to the second communication system includes the eNB 210A, the HeNB 210B, and the HeNB-GW 220B.

The UE 10 is a device (User Equipment) configured to communicate with the first communication system or the second communication system. For example, the UE 10 has a function of performing radio communications with the NB 110A and the HNB 110B. Alternatively, the UE 10 has a function of performing radio communications with the eNB 210A and the HeNB 210B.

The NB 110A includes a macrocell 111A and is a device (NodeB) that performs radio communications with the UE 10 in the macrocell 111A.

The HNB 110B includes a specific cell 111B and is a device (Home NodeB) that performs radio communications with the UE 10 in the specific cell 111B.

The RNC 120A is connected to the NB 110A and is a device (Radio Network Controller) that establishes a radio connection (RRC Connection) with the UE 10 in the macrocell 111A.

The HNB-GW 120B is connected to the HNB 110B and is a device (Home NodeB Gateway) that establishes a radio connection (RRC Connection) with the UE 10 in the specific cell 111B.

The SGSN 130 is a device (Serving GPRS Support Node) that performs packet exchange in a packet exchange domain. The SGSN 130 is provided in the core network 50. Although not shown in FIG. 1, a device (MSC; Mobile Switching Center) that performs call switching in a call switching domain may be provided in the core network 50.

The eNB 210A includes a macrocell 211A and is a device (evolved NodeB) that performs radio communications with the UE 10 in the macrocell 211A.

The HeNB 210B includes a specific cell 211B and is a device (Home evolved NodeB) that performs radio communications with the UE 10 in the specific cell 211B.

The HeNB-GW 220B is connected to the HeNB 210B and is a device (Home evolved NodeB Gateway) that manages the HeNB 210B.

The MME 230 is connected to the HeNB 210B through the HeNB-GW 220B and is a device (Mobility Management Entity) that manages a mobility of the UE 10 that has established the radio connection with the HeNB 210B.

The macrocell and the specific cell should be understood as functions to perform radio communications with the UE 10. However, it should be noted that the macrocell and the specific cell are also used as terms indicating service areas of a cell. Cells such as the macrocell and the specific cell are identified by a frequency, a spread code, a timeslot, or the like used therein.

In some cases, the specific cell is referred to as a femtocell, a CSG (Closed Subscriber Group), and a home cell. The specific cell is configured such that an access type is settable. The access type specifies a UE 10 allowed to access the specific cell, and is set at "Closed," "Hybrid," or "Open."

A "Closed" specific cell is configured to allow only a specific user managed by the specific cell to be provided with services.

A "Hybrid" specific cell is configured to allow, for example, the specific user managed by the specific cell to perform communications with a high quality and the non-specific user not managed by the specific cell to perform communications with best effort quality.

An "Open" specific cell is configured to allow all the UEs 10 to be provided with a service, as in a macrocell. In the "Open" cell, communication qualities among the UEs 10 are not differentiated irrespective of whether the UE 10 is managed by the specific cell or not.

The access type may also be "ACCESS CLASS BARRED" that prohibits an access of the UE 10 for each access class, or a "CELL BARRED" that prohibits the access of the UE 10 for each cell.

Regardless of which access type is set, the specific user is preferably associated with the specific cell. Even in the specific cell set to "Closed," preferably, the non-specific user is allowed to perform attach process and a location registration to the specific cell.

(Configuration of Network Device)

Figure 2:
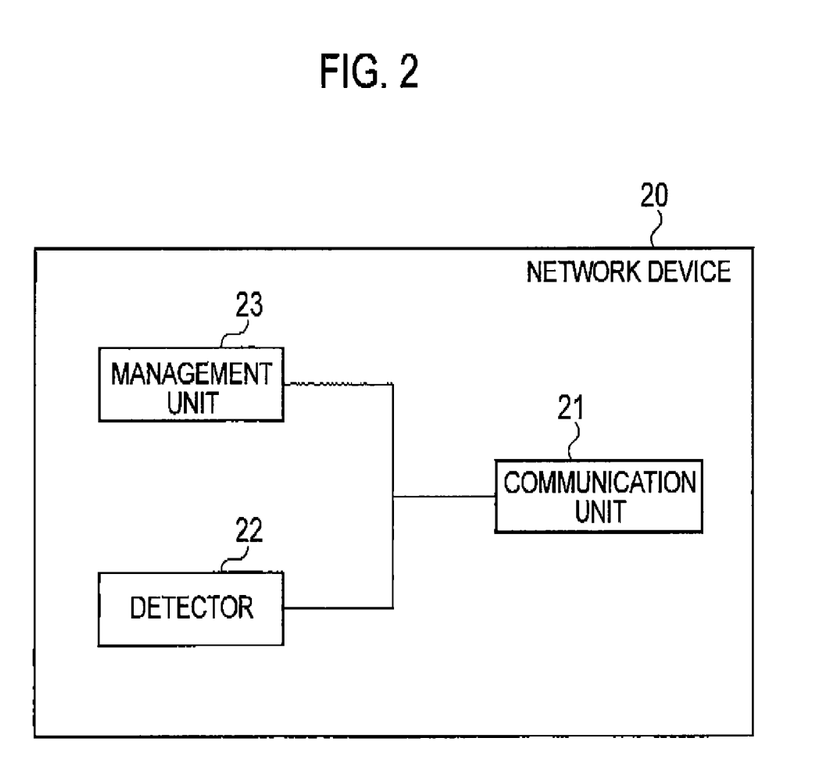
FIG. 2 is a diagram showing a network device 20 according to the first embodiment.

A configuration of a network device according to the first embodiment is described with reference to a drawing. FIG. 2 is a diagram showing a network device 20 according to the first embodiment. As shown in FIG. 2 the network device 20 includes a communication unit 21, a detection unit 22, and a management unit 23.

The network device 20 may be a device (e.g., the HNB 110E or the HeNB 210B) that manages the specific cell. Alternatively, the network device 20 may be a device (e.g., the RNC 120A, the HNB-GW 120B, the SGSN 130, the HeNB-GW 220, or the MME 230) provided at a higher level than a device managing the specific cell.

The communication unit 21 communicates with the UE 10. The communication unit 21 also communicates with another network device.

For example, the communication unit 21 notifies a predetermined user (e.g., a proprietor or a guardian) of a presence state of the UE 10 managed by the management unit 23 described later. Alternatively, the communication unit 21 notifies a predetermined device (e.g., a service providing server) of the presence state of the UE 10 managed by the management unit 23 described later. The service providing server is a server providing the report service, the safety service, the locking service, or the home network service.

Specifically, the communication unit 21 notifies the predetermined user or device of the presence state of the UE 10 managed by the management unit 23 when the presence of a predetermined specific user is detected. Alternatively, the communication unit 21 notifies the predetermined user or device of the presence state of the UE 10 managed by the management unit 23 when the presence of the predetermined specific user is detected. The predetermined specific user may be all the specific users associated with the specific cell or may be some of the specific users associated with the specific cell.

The detection unit 22 detects the presence state of the UE 10 (specific user or non-specific user) in the specific cell. Specifically, the detection unit 22 detects the presence state of the specific user or the non-specific user through the following processing.

Firstly, the detection unit 22 detects the attach process to the specific cell by the non-specific user, the location registration to the specific cell by the non-specific user, and a setup completion of a communication call to the specific cell by the non-specific user. Similarly, the detection unit 22 detects the attach process to the specific cell by the specific user, the location registration to the specific cell by the specific user, and the setup completion of a communication call with the specific cell by the specific user.

Secondary, the detection unit 22 detects detach process from the specific cell by the non-specific user, a location registration failure to the specific cell by the non-specific user, and a communication call setup release to the specific cell by the non-specific user. Similarly, the detection unit 22 detects detach process from the specific cell by the specific user, a location registration failure to the specific cell by the specific user, and a communication call setup release to the specific cell by the specific user.

Thirdly, the detection unit 22 detects the attach process to a cell other than the specific cell by the non-specific user, the location registration to the cell other than the specific cell by the non-specific user, and the setup completion of a communication call with the cell other than the specific cell by the non-specific user. Similarly, the detection unit 22 detects the attach process to the cell other than the specific cell by the specific user, the location registration to the cell other than the specific cell by the specific user, and the setup completion of a communication call with the cell other than the specific cell by the specific user.

The cell other than the specific cell, which is not particularly limited, is a cell (another specific cell or another macrocell) provided around the specific cell.

The management unit 23 manages the presence state of the non-specific user in the specific cell in addition to the presence state of the specific user in the specific cell. Specifically, the management unit 23 manages whether the UE 10 (specific user or non-specific user) is present in the specific cell or not on the basis of a result of the detection by the detection unit 22.

Firstly, the management unit 23 manages the presence of the non-specific user in the specific cell on the basis of the detection of the attach process to the specific cell by the non-specific user, the detection of the location registration to the specific cell by the non-specific user, and the detection of the setup completion of a communication call with the specific cell by the non-specific user. Similarly, the management unit 23 manages the presence of the specific user in the specific cell on the basis of the detection of the attach process to the specific cell by the specific user, the detection of the location registration to the specific cell by the specific user, and the detection of the setup completion of a communication call with the specific cell by the specific user.

Secondary, the management unit 23 manages the absence of the non-specific user in the specific cell on the basis of the detection of the detach process from the specific cell by the non-specific user, the detection of the location registration failure to the specific cell by the non-specific user, and the detection of the communication call setup release to the specific cell by the non-specific user. Similarly, the management unit 23 manages the absence of the specific user in the specific cell on the basis of the detection of the detach process from the specific cell by the specific user, the detection of the location registration failure to the specific cell by the specific user, and the detection of the communication call setup release to the specific cell by the specific user.

Thirdly, the management unit 23 manages the absence of the non-specific user in the specific cell on the basis of the detection of the attach process to the cell other than the specific cell by the non-specific user, the detection of the location registration to the cell other than the specific cell by the non-specific user, and the setup completion of a communication call with the cell other than the specific cell by the non-specific user. Similarly, the management unit 23 manages the absence of the specific user in the specific cell on the basis of the detection of the attach process to the cell other than the specific cell by the specific user, the location registration to the cell other than the specific cell by the specific user, and the setup completion of a communication call with the cell other than the specific cell by the specific user.

(Operation of Mobile Communication System)

Figure 3:
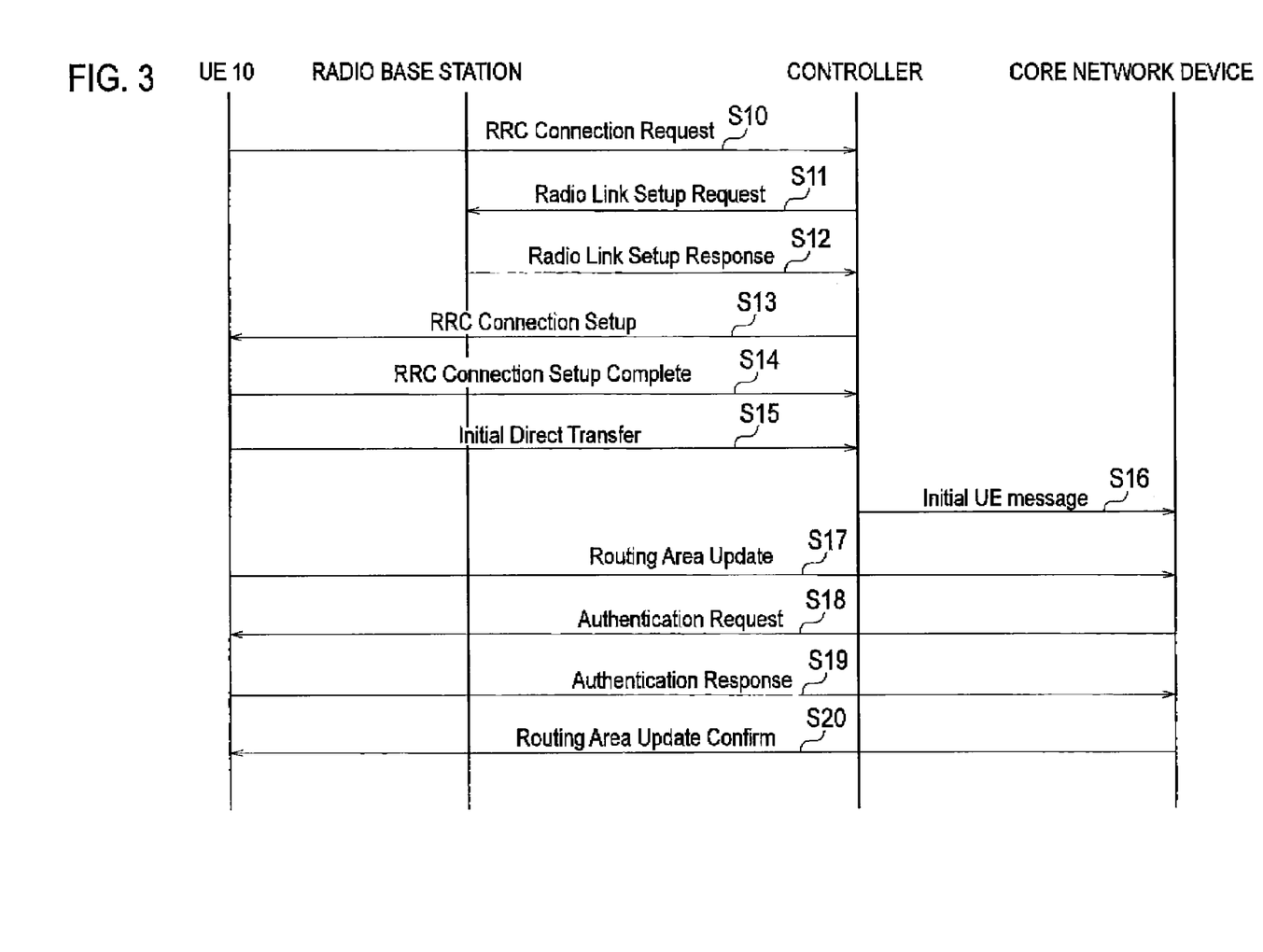
FIG. 3 is a sequence diagram showing operations of the mobile communication system 100 according to the first embodiment.
Figure 4:
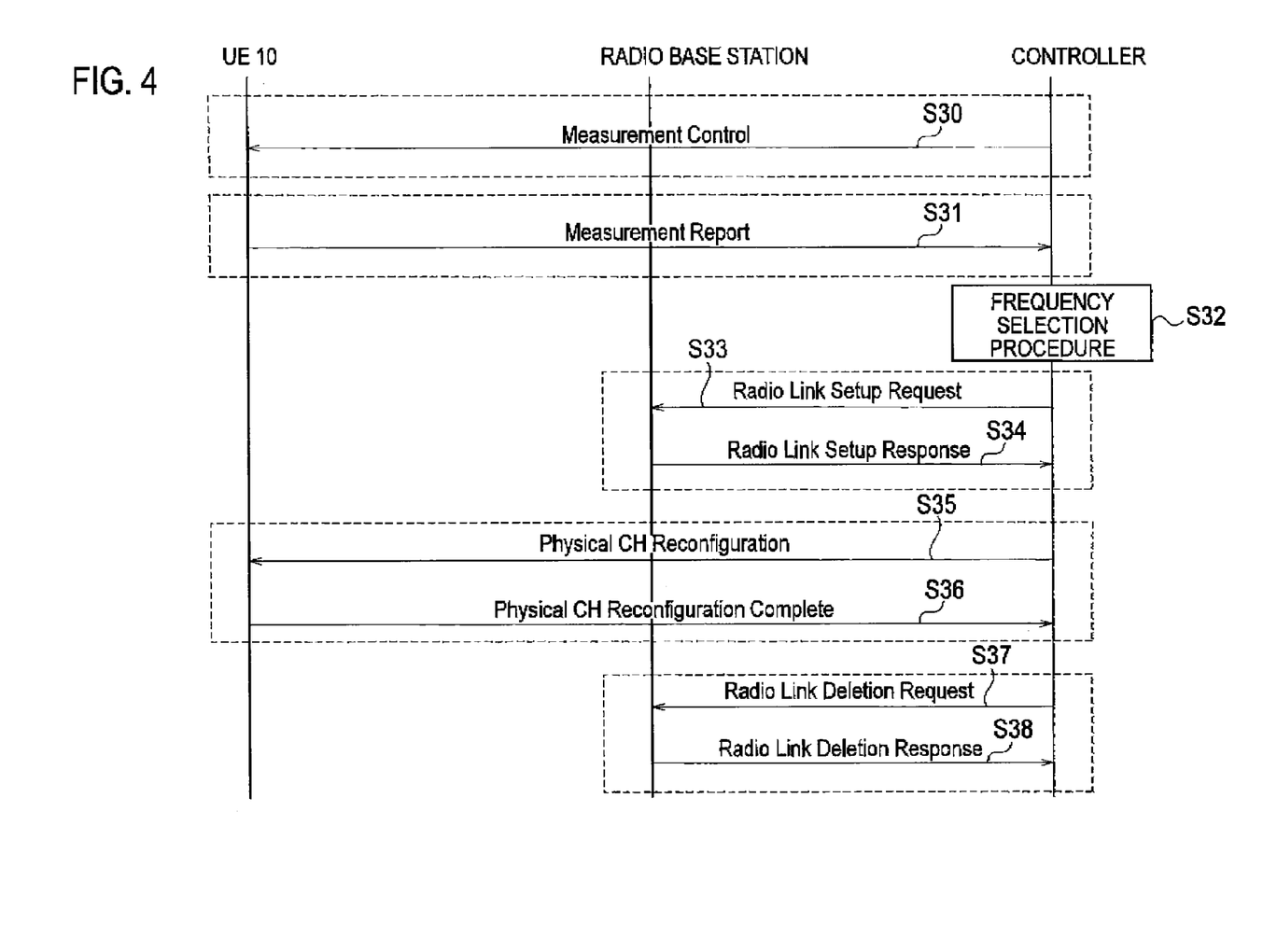
FIG. 4 is a sequence diagram showing operations of the mobile communication system 100 according to the first embodiment.

Operations of the mobile communication system according to the first embodiment will be described below with reference to drawings. FIG. 3 and FIG. 4 are sequence diagrams showing operations of the mobile communication system 100 according to the first embodiment.

First of all, a communication call setup procedure and a location registration procedure are described with reference to FIG. 3. In FIG. 3, the radio base station is the NBA 110A, the HNB 110B, the eNB 210A, or the HeNB 210B, for example. The radio controller is the RNC 120A, the HNB-GW 120B, or the HeNB-GW 220B, for example. The core network device is the SGSN 130 or the MME 230 for example.

In an initial state in FIG. 3, the UE 10 is communicating with none of the cells (in an Idle mode).

As shown in FIG. 3, in Step 10, the UE 10 transmits to the radio controller a radio connection request (RRC Connection Request) for the connection with the controller.

In Step 11, the radio controller sends the radio base station a setup request (Radio Link Setup Request) for a radio link between the UE 10 and the radio base station.

In Step 12, the radio base station transmits to the radio controller, a setup response (Radio Link Setup Response) for the radio link between the UE 10 and the radio base station.

In Step 13, the radio controller transmits to the UE 10, a setup command (RRC Connection Setup) for a radio connection between the UE 10 and the radio controller.

In Step 14, the UE 10 transmits to the radio controller, a setup complete (RRC Connection Setup Complete) for the radio connection between the UE 10 and the radio controller.

The radio controller can detect the communication call completion of the UE 10 in Step 14. Specifically, when the communication call to the specific cell is set for the UE 10 of a non-specific user, the setup completion of communication with the specific cell by the non-specific user is detected. Thus, the presence of the non-specific user in the specific cell is managed. On the other hand, when the UE 10 is the non-specific user with the communication call to the cell other than the specific cell being set, the setup completion of communication with the cell other than the specific cell by the non-specific user is detected. Thus, the absence of the non-specific user in the specific sell is managed.

In Step 15, the UE 10 transmits to the radio controller, an initial uplink message (Initial Direct Transfer).

In Step 16, the radio controller transmits to the core network device, an initial user message (Initial UE message).

In Step 17, the UE 10 transmits to the core network device, a location registration update request (Routing Area Update).

In Step 18, the core network device transmits an authentication request to the UE 10.

In Step 19, the UE 10 transmits an authentication response to the core network device.

In Step 20, the core network device transmits a location registration update completion (Routing Area Update Confirm) to the UE 10.

In Step 20, the core network device can detect the location registration by the UE 10. Specifically, when the UE 10 is the non-specific user that has performed location registration to the specific cell, the location registration to the specific cell by the non-specific user is detected. Thus, the presence of the non-specific user in the specific cell is managed. On the other hand, when the UE 10 is the non-specific user that has performed the location registration to a cell other than the specific cell, the location registration to the cell other than the specific cell by the non-specific user is detected. Thus, the absence of the non-specific user in the specific cell is managed.

Second of all, a handover procedure is described with reference to FIG. 4. In FIG. 4, the radio base station is the NB 110A, the HNB 110B, the eNB 210A, or the HeNB 210B, for example. The radio controller is the RNC 120A, the HNB-GW 120B, or the HeNB-GW 220B for example.

In an initial state in FIG. 4, the UE 10 has been communicating with any of the cells (in a Connect mode).

As shown in FIG. 4, in Step 30, the radio controller transmits to the UE 10, a measurement command (Measurement Control) for a frequency that can be acquired by the UE 10.

In Step 31, the UE 10 transmits to the radio controller, a measurement result (Measurement Report) for the frequency that can be acquired by the UE 10.

In Step 32, the radio controller selects the frequency that the UE 10 should use on the basis of the result of the measurement for the frequency that can be acquired by the UE 10. Specifically, the radio controller selects a cell (target cell) as a handover destination.

In Step 33, the radio controller transmits to the radio base station managing the cell (target cell) as the handover destination, a setup request (Radio Link Setup Request) for a radio link between the UE 10 and the radio base station.

In Step 34, the radio base station managing the cell (target cell) as the handover destination transmits to the radio controller, a setup response (Radio Link Setup Response) for the radio link between the UE 10 and the radio base station.

In Step 35, the radio controller transmits to the UE 10, a reconfiguration command (Physical CH Reconfiguration) for a physical channel.

In Step 36, the UE 10 transmits to the radio controller, a reconfiguration complete (Physical CH Reconfiguration Complete) for the physical channel.

In Step 37, the radio controller transmits to the radio base station managing a cell as a handover source (source cell), a deletion request (Radio Link Deletion Request) for the radio link.

In Step 38, the radio base station managing the cell (source cell) as the handover source transmits to the radio controller, a deletion response (Radio Link Deletion Response) for the radio link. While the handover procedure is described herein, the embodiment can be applied to a cell update procedure such as a reconnection procedure and a common channel transition.

The radio controller can detect the communication call setup release of the UE 10 in Step 38. Specifically when the UE 10 is the non-specific user with the communication call setup to the specific cell released, the communication call setup release to the specific cell by the non-specific user is detected. Thus, the absence of the non-specific user in the specific cell is managed.

(Operational Effects)

In the first embodiment, the management unit 23 manages the presence state of the non-specific user in the specific cell in addition to the presence state of the specific user in the specific cell. Thus, through the management of the presence state of the non-specific user, the new services can be provided.

For example, the new services include: the service of notifying the user managing the specific cell of presence states of the specific user and the non-specific user (report service); (2) the service of notifying the manager such as the security company of the presence states of the specific user (security service); (3) the service of locking the entrance for the building or the room in which the specific cell is provided on the basis of the presence states of the specific user and the non-specific user (locking service); and (4) the service of controlling the home electrical appliance provided near the specific cell on the basis of the presence states of the specific user and the non-specific user (home network service).

For example, in the report service, when a specific user (e.g., a child or an elderly) becomes out of a specific cell, a predetermined user (e.g., a guardian) is notified of the presence state.

Alternatively, in the report service and the safety service, when a non-specific user is in a specific cell while a predetermined specific user is out of the specific cell, a user (e.g., proprietor) managing the specific cell or a security company is notified of the presence state.

Alternatively, in the locking service, when not all the specific users are in a specific cell, an entrance in the provided specific cell is locked.

Alternatively, in the home network service, when not all the predetermined specific users are in a specific cell, power supply or gas supply to a home electrical appliance provided near the specific cell is stopped.

As a new service, a preferential control for the specific users may be performed in accordance with a ratio between the number of non-specific users and the number of specific users in the specific cell. For example, when the management unit 23 detects that the number of non-specific users in the specific cell is equal to or larger than a predetermined number, the devices forming the radio access network and the core network 50 are notified of this information, and the throughputs of the specific users are prioritized.

Specifically, performing the following network controls is conceivable.

Lowering a communication rate of the non-specific users

Transferring the non-specific users to a macrocell or an LTE through handover or redirection Refusing to receive a communication rate increasing request and a call connection request from the non-specific users

[First Modification]

A first modification of the first embodiment will be described below with reference to drawings. Differences from the first embodiment are mainly described below.

Figure 5:
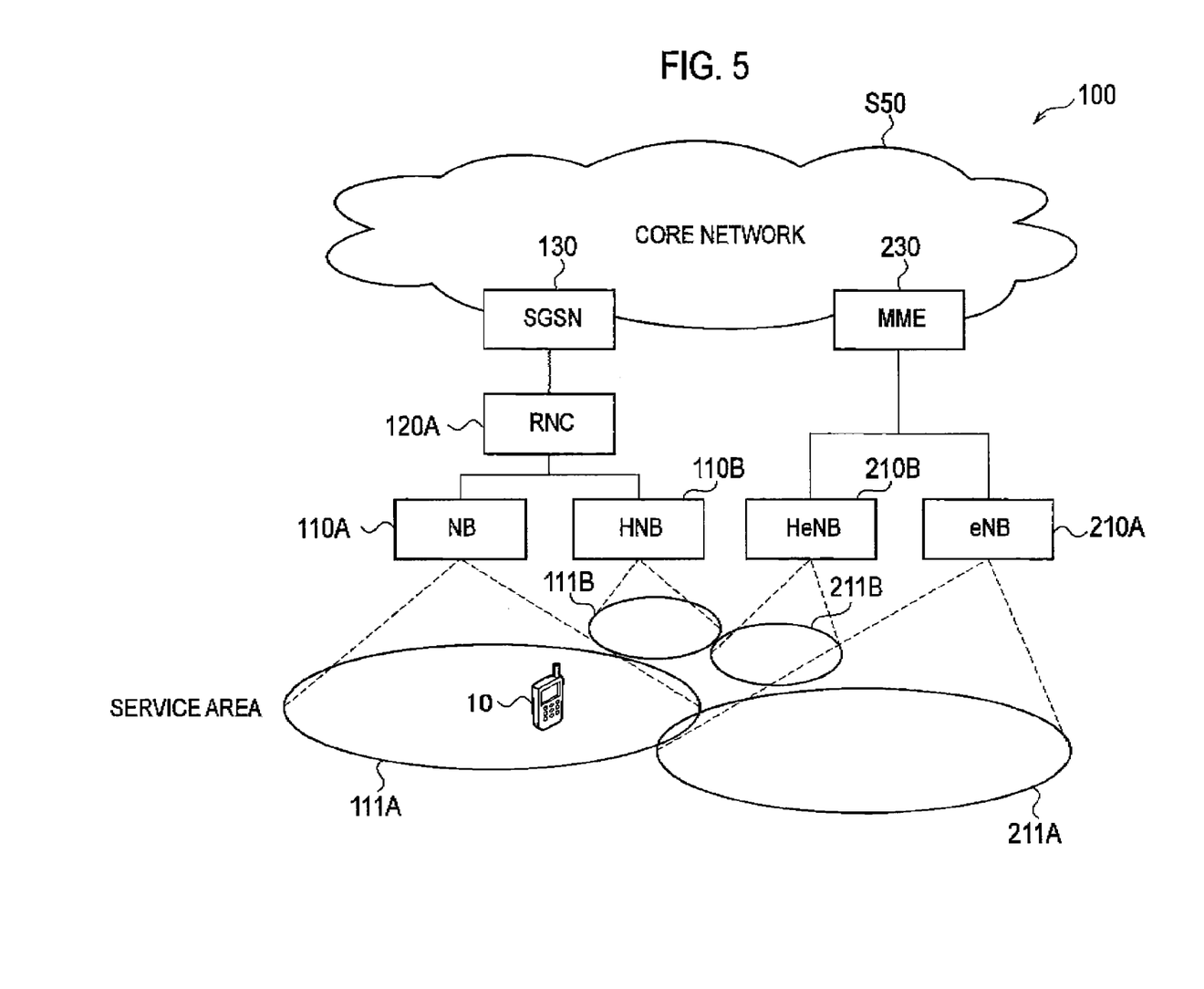
FIG. 5 is a diagram showing a mobile communication system 100 according to a first modification.

Specifically, in the first embodiment, an upper level node of the HNB 110B is the HNB-GW 120B. Instead, in the first modification, the upper level node of the HNB 110B is the RNC 120A.

In the first modification, instead of the HNB-GW 120B, the RNC 120A manages the HNB 110B. In other words, the RNC 120A provides a function similar to that of the HNB-GW 120B to a device subordinate to the RNC 120A.

Moreover, in the first embodiment, an upper level node of the HNB 210B is the HeNB-GW 220B. Instead, in the first modification, the upper level node of the HNB 210B is the MME 230 as shown in FIG. 5.

In the first modification, instead of the HeNB-GW 220B, the HeNB 210B provides a function similar to that of the HeNB-GW 2203 to a device subordinate to the HeNB 210B.

The HNB-GW 120B alone may be omitted or the HeNB-GW 220B alone may be omitted.

Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the above-described embodiment, a case is described in which the structure (the communication unit 21, the detection unit 22, and the management unit 23) provided in the network device 20 are provided in a single device. The embodiment is not limited to this. Specifically, the communication unit 21, the detection unit 22, and the management unit 23 may be respectively provided in different devices.

For example, the detection unit 22 may be provided in the RNC 120A, the HNB-GW 120B, the eNB 210A, the HeNB 210B, the HeNB-GW 220B, or the like. The management unit 23 may be provided in a server (e.g., a predetermined user or device) provided in the core network 50. The communication unit 21 is preferably provided in a device including the management unit 23.

For communications among the devices, a control signal is used that includes RANAP (Radio Access Network Application Part), NBAP (NodeB Application part), RNSAP (Radio Network Subsystem Application), and HNBAP (Home NodeB Application Part).

The above-described operations of the UE 10 may be implemented by hardware, a software module executed by a processor, or a combination of both.

The software module may be provided in any type of storage medium including a RAM (Random Access Memory), flash memory, a ROM (Read Only Memory), EPROM (Erasable Programmable ROM), EEPROM (Electronically Erasable and Programmable ROM), a resistor, a hard disk drive, a removable disk, and a CD-ROM.

Such a storage medium is connected to a processor so that the processor can read and write information from and to the storage medium. Such a storage medium may be integrated in the processor. Such a storage medium and processor may be provided in an ASIC. Such an ASIC may be provided in the UE 10. Such a storage medium and processor may be provided in the UE 10 as a discrete component.

Note that the entire content of Japanese Patent Application No. 2009-289777 (filed on Dec. 21, 2009) is incorporated herein by reference.

INDUSTRIAL APPLICABILITY

The present invention can provide a mobile communication system, a network device, and a mobile communication method that manage a presence state of a non-specific user to allow a provision of new services, and thus is useful in radio communications and the like.

EXPLANATION OF THE REFERENCE NUMERALS

10 . . . communication terminal device, 20 . . . network device, 21 . . . communication unit, 22 . . . detection unit, 23 . . . management unit, 50 . . . core network, 100 . . . mobile communication system, 110A . . . NB, 110B . . . HNB, 111A . . . macrocell, 111B . . . specific cell, 120A . . . RNC, 120B . . . HNB-GW, 130 . . . SGSN, 210A . . . eNB, 210B . . . HeNB, 211A . . . macrocell, 211E . . . specific cell, 220B . . . HeNB-GW, 230 . . . MME

The invention claimed is:

1. A mobile communication system comprising:
an access-restricted cell configured to allow a first user to be provided with open access to services of the access-restricted cell and prohibit a second user other than the first user from accessing the services of the access-restricted cell with the exception of performing at least one of an attach process to the access restricted cell or a location registration via the access-restricted cell; and a network device configured to manage a presence state of the second user in the access-restricted cell in addition to a presence state of the first user in the access-restricted cell.

2. The mobile communication system according to claim 1, wherein the network device is configured to:
  detect the attach process to the access-restricted cell by the second user, and the location registration to the access-restricted cell by the second user; and
  manage a presence of the second user in the access-restricted cell on the basis of a result of the detection.

3. The mobile communication system according to claim 1, wherein the network device is configured to:
  detect a detach process from the access-restricted cell by the second user, and a failure in location registration to the access-restricted cell by the second user; and
  manage an absence of the second user in the access-restricted specific cell on the basis of a result of the detection.

4. The mobile communication system according to claim 1, wherein the network device is configured to:
  detect an attach process to a cell other than the access-restricted cell by the second user, a location registration to the cell other than the access-restricted cell by the second user, and a setup completion of a communication call to the cell other than the access-restricted specific cell by the non-specific second user; and
  manage an absence of the second user in the specified cell based on a result of the detection.

5. The mobile communication system according to claim 1, wherein the network device is configured to output a notification of the presence state of the first user and the second user when a presence of a predetermined first user in the access-restricted cell is detected.

6. The mobile communication system according to claim 1, wherein the network device is configured to output a notification of the presence state of the first user and the second user when an absence of a predetermined first user in the access-restricted cell is detected.

7. A network device provided in a mobile communication system including a access-restricted cell configured to allow a first user to be provided with open access to services of the access-restricted cell and to prohibit a second user other than the first user from accessing the services of the access-restricted cell with the exception of performing at least one of an attach process to the access restricted cell or a location registration via the access-restricted cell, the network device comprising circuitry configured to manage a presence state of the second user in the access-restricted cell in addition to a presence state of the first user in the access-restricted cell.

8. A mobile communication method used in a mobile communication system including a access-restricted cell configured to allow a first user to be provided with open access to services of the access-restricted cell a service and to prohibit a second user other than the first user from accessing the services of the access-restricted cell with the exception of performing at least one of an attach process to the access restricted cell or a location registration via the access-restricted cell, the method comprising managing a presence state of the second user in the access-restricted cell in addition to a presence state of the first user in the access-restricted cell.

* * * * *